United States Patent
Ko et al.

(10) Patent No.: US 11,031,589 B2
(45) Date of Patent: Jun. 8, 2021

(54) CHEMICAL-FREE PRODUCTION OF PROTECTED ANODE ACTIVE MATERIAL PARTICLES FOR LITHIUM BATTERIES

(71) Applicants: Yaw Yuh Ko, Taipei (TW); Bor Z. Jang, Centerville, OH (US)

(72) Inventors: Yaw Yuh Ko, Taipei (TW); Bor Z. Jang, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 27 days.

(21) Appl. No.: 16/199,817

(22) Filed: Nov. 26, 2018

(65) Prior Publication Data

US 2020/0168898 A1  May 28, 2020

(51) Int. Cl.
| | |
|---|---|
| *H01M 4/36* | (2006.01) |
| *H01M 4/62* | (2006.01) |
| *H01M 10/052* | (2010.01) |
| *H01M 4/04* | (2006.01) |
| *H01M 4/02* | (2006.01) |

(52) U.S. Cl.
CPC ........... *H01M 4/366* (2013.01); *H01M 4/043* (2013.01); *H01M 4/625* (2013.01); *H01M 10/052* (2013.01); *H01M 2004/027* (2013.01)

(58) Field of Classification Search
CPC ............................. H01M 4/366; H01M 4/625
See application file for complete search history.

(56) References Cited

U.S. PATENT DOCUMENTS

| | | |
|---|---|---|
| 2,798,878 A | 7/1957 | Hummers |
| 2005/0136330 A1 | 6/2005 | Mao et al. |

OTHER PUBLICATIONS

Chen et al.,"Sandwich structure of graphene-protected silicon/carbon nanofibersfor lithium-ion battery anodes", Electrochimica Acta 210, 53-60, 2016.*
Anderson et al., "The Use of Esters of N-Hydroxysuccinimide in Peptide Synthesis" J. Amer. Chem. Soc. (1964) vol. 86, No. 9, pp. 1839-1842.
Tao et al., "Porous Si/C/reduced graphene oxide microspheres by spray drying as anode for Li-ion batteries" Journal of Electroanalytical Chemistry (2017) vol. 797, pp. 16-22.
U.S. Appl. No. 16/238,029 Nonfinal Office Action dated May 26, 2020, 7 pages.

* cited by examiner

*Primary Examiner* — Ladan Mohaddes

(57) ABSTRACT

Provided is an anode particulate for a lithium battery, the particulate comprising a core and a thin encapsulating layer that encapsulates or embraces the core, wherein the core comprises a single or a plurality of primary particles of an anode active material, having a volume Va, dispersed or embedded in a porous carbon matrix (a carbon foam), wherein the porous carbon matrix contains pores having a pore volume Vp, and the thin encapsulating layer comprises graphene sheets and has a thickness from 1 nm to 10 μm, an electric conductivity from $10^{-6}$ S/cm to 20,000 S/cm and a lithium ion conductivity from $10^{-8}$ S/cm to $5 \times 10^{-2}$ S/cm and wherein the volume ratio Vp/Va is from 0.5/1.0 to 5.0/1.0. The carbon foam is preferably reinforced with a high-strength material.

31 Claims, 8 Drawing Sheets

CHEMICAL-FREE PRODUCTION OF PROTECTED ANODE ACTIVE MATERIAL PARTICLES FOR LITHIUM BATTERIES

FIELD OF THE INVENTION

The present invention relates generally to the field of lithium batteries and, in particular, to an environmentally benign and cost-effective method of producing graphene-embraced, porous carbon-protected anode active materials for lithium batteries.

BACKGROUND

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during subsequent charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies $0<a\leq5$) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/or brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conductive to lithium ions (e.g., ceramic or oxide coating). Ideally, the protective material should meet the following requirements: (a) The protective material must be lithium ion-conducting as well as initially electron-conducting (when the anode electrode is made) and be capable of preventing liquid electrolyte from being in constant contact with the anode active material particles (e.g. Si). (b) The protective material should also have high fracture toughness or high resistance to crack formation to avoid disintegration during cycling. (c) The protective material must be inert (inactive) with respect to the electrolyte, but be a good lithium ion conductor. (d) The protective material must not provide any significant amount of defect sites that irreversibly trap lithium ions. (e) The combined protective material-anode material structure must allow for an adequate amount of free space to accommodate volume expansion of the anode active material particles when lithiated. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present invention to meet these needs and address the issues associated the rapid capacity decay of a lithium battery containing a high-capacity anode active material.

SUMMARY OF THE INVENTION

The invention provides an anode particulate or multiple anode particulate for a lithium battery. The particulate or at least one of the multiple particulates comprises a core and a thin encapsulating layer encapsulating or embracing the core, wherein the core comprises a single or a plurality of primary particles of an anode active material (having a volume Va) dispersed or embedded in a porous carbon matrix (a carbon foam matrix), wherein the porous carbon matrix or carbon foam matrix contains pores having a pore volume Vp, and the thin encapsulating layer comprises graphene sheets and has a thickness from 1 nm to 10 μm, an electric conductivity from $10^{-6}$ S/cm to 20,000 S/cm and a lithium ion conductivity from $10^{-8}$ S/cm to $5\times10^{-2}$ S/cm and wherein the volume ratio Vp/Va is from 0.3/1.0 to 5.0/1.0. Typically and preferably, the porous carbon matrix electronically and/or ionically connects the encapsulating layer and the primary particles of the anode active material. In certain desired embodiments, the porous carbon matrix or carbon foam is in physical contact with or chemically bonded to both the encapsulating layer and the primary particles of anode active material.

The graphene sheets are preferably selected from pristine graphene, graphene fluoride, graphene chloride, graphene bromide, graphene iodide, nitrogenated graphene, hydrogenated graphene, doped graphene, chemically functionalized graphene, or a combination thereof and wherein said graphene sheets do not include CVD graphene, graphene oxide (GO), and reduced graphene oxide (RGO). In certain other embodiments, the graphene sheets are selected from CVD graphene, graphene oxide (GO), or reduced graphene oxide (RGO).

Typically and preferably, the graphene sheets are chemically bonded with a carbon material.

In some preferred embodiments, the porous carbon matrix (carbon foam structure) is reinforced with a high-strength material selected from carbon nanotubes (single-walled or multi-walled CNTs), carbon nanofibers (e.g. vapor-grown CNFs or carbonized electron-spun polymer nanofibers), carbon or graphite fibers, polymer fibrils (e.g. the aromatic polyamide fibrils extracted from aromatic polyamide fibers, such as Kevlar fibers), graphene sheets, expanded graphite flakes, glass fibers, ceramic fibers, metal filaments or metal nanowires, whiskers (e.g. carbon whiskers, graphite whiskers, ceramic whiskers), or a combination thereof. These high-strength materials may be dispersed into a polymer to make a polymer composite prior to being combined with or during the combination with the anode active material particles.

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof. The Li alloy contains from 0.1% to 10% by weight of a metal element selected from Zn, Ag, Au, Mg, Ni, Ti, Fe, Co, V, or a combination.

In certain embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein x=1 to 2.

The anode active material is preferably in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

In certain embodiments, at least one of the anode active material particles is coated with a layer of carbon or graphene prior to being encapsulated by a precursor to the carbon foam matrix.

The anode particulate may further comprise from 0.1% to 40% by weight of a lithium ion-conducting additive dispersed in said thin encapsulating layer or in ionic contact with said anode active material particles encapsulated therein. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\le1$, $1\le y\le4$. In some embodiments, the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The present invention also provides a powder mass of anode particulates containing the invented anode particulate. Also provided is a battery anode containing the invented particulate described above. The invention further provides a battery containing such a battery anode. The battery may be a lithium-ion battery, lithium metal secondary battery, lithium-sulfur battery, lithium-air battery, or lithium-selenium battery.

The invention also provides an impact-transfer method of producing multiple particulates containing the aforementioned anode particulate. The method comprises:

a) mixing multiple particles of a graphitic material, multiple polymer-protected anode active material particles (including secondary particles composed of single and multiple anode active material particles fully embraced by a polymer coating or embedded in a polymer matrix), and optional particles of ball-milling media (i.e. with or without the presence of externally added milling balls or beads) to form a mixture in an impacting chamber of an energy impacting apparatus, wherein, in some embodiments, the graphitic material has never been previously intercalated, oxidized, or exfoliated (the impacting chamber may contain therein no previously produced isolated graphene sheets or a desired amount of isolated graphene sheets);

b) operating the energy impacting apparatus with a frequency and an intensity for a length of time sufficient for peeling off graphene sheets from the particles of graphitic material and transferring the peeled graphene sheets to surfaces of the polymer-coated anode active material particles and fully embrace or encapsulate the polymer-protected particles to produce particles of graphene-embraced or graphene-encapsulated polymer-protected anode active material inside the impacting chamber;

c) recovering the particles of graphene-embraced or graphene-encapsulated polymer-protected anode active material from the impacting chamber and separating the particles of ball-milling media (if present) from the particles of graphene-embraced or graphene-encapsulated polymer-protected anode active material particles; and d) thermally converting the polymer in the polymer-protected particles into a porous carbon structure or foam to obtain the multiple particulates of graphene-embraced, carbon foam-protected anode active material particles.

It may be noted that the terms "polymer-protected" and "polymer-coated" are herein used interchangeably. The polymer-protected anode active material particles includes secondary particles composed of single and multiple anode active material particles that are fully embraced by a polymer coating or embedded in a polymer matrix. In some embodiments, the polymer-coated anode active material particles comprise a polymer selected from a thermoplastic, thermoset resin, rubber or elastomer, filled or reinforced polymer, interpenetrating polymer network, biopolymer, pitch (e.g. coal tar pitch, petroleum pitch, mesophase pitch, etc.), sugar (e.g. sucrose), starch, or a combination thereof.

The method is strikingly simple, fast, scalable, environmentally benign, and cost-effective. In some embodiments, the graphitic material or carbonaceous material has never been intercalated, oxidized, or exfoliated and does not include previously produced isolated graphene sheets.

The method may further comprise a step of incorporating the graphene-embraced or graphene-encapsulated, porous carbon foam-protected anode active material particles into a battery electrode.

The particles of ball-milling media may contain milling balls selected from ceramic particles, metal oxide particles, metal particles, glass particles, polymer particles, or a combination thereof. Metal particles that are ferromagnetic or are capable of being attracted to a magnetic field are particularly desired since they can be more readily or easily removed or separated from the graphene-embraced polymer-coated active materials that are normally non-magnetic.

There can be some particles of graphitic material that are not fully utilized (i.e., not all graphene sheets have been peeled off) after step b). Hence, in an embodiment, an amount of residual graphitic material remains after step b) and the method further comprises a step of incorporating the graphene-embraced polymer-coated active material and the residual graphitic material into a battery electrode. The residual graphitic material can serve as a conductive filler in the battery electrode.

In another embodiment, an amount of residual graphitic material remains after step b), and step c) includes a step of partially or completely separating the residual amount of graphitic material from the graphene-embraced electrode active material.

In some embodiments, the particles of anode active material contain prelithiated particles. In other words, before the electrode active material particles (such as Si or $SnO_2$) are coated by the polymer (or embedded in a polymer matrix) and embraced by graphene sheets, these particles have been previously intercalated with Li ions (e.g. via electrochemical charging) up to an amount of 0.1% to 30% by weight of Li.

In some embodiments, prior to being coated with (or being embedded in) a polymer, the particles of anode active material contain particles pre-coated with a coating layer of a conductive material selected from carbon, pitch, carbonized resin, a conductive polymer, a conductive organic material, a metal coating, a metal oxide shell, graphene sheets, or a combination thereof. The coating layer thickness is preferably in the range from 1 nm to 20 μm, preferably from 10 nm to 10 μm, and further preferably from 100 nm to 1 μm.

In some embodiments, the particles of anode active material contain particles that are pre-coated with a carbon precursor material selected from a coal tar pitch, petroleum pitch, mesophase pitch, polymer, organic material, or a combination thereof so that the carbon precursor material resides between surfaces of the anode active material particles and the polymer coating or matrix. This carbon precursor, along with the polymer coating, gets carbonized and becomes part of the porous carbon structure or carbon foam during the subsequent pyrolyzation or heat-treating procedure.

In some embodiments, the polymer coated on the anode active material particles (or the polymer in which anode active material particles are embedded) contains a blowing agent (foaming agent), a reinforcement material, or both that are dispersed therein. The reinforcement material may contain a high-strength material selected from carbon nanotubes (single-walled or multi-walled CNTs), carbon nanofibers (e.g. vapor-grown CNFs or carbonized electron-spun polymer nanofibers), carbon or graphite fibers, polymer fibrils (e.g. the aromatic polyamide fibrils extracted from aromatic polyamide fibers, such as Kevlar fibers), graphene sheets, expanded graphite flakes, glass fibers, ceramic fibers, metal filaments or metal nanowires, whiskers (e.g. carbon whiskers, graphite whiskers, ceramic whiskers), or a combination thereof.

The multiple polymer-coated anode active material particles may be produced by operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, extrusion and pelletizing, or a combination thereof.

In some embodiments, the particles of solid anode active material contain particles pre-coated with a sacrificial material selected from a metal, pitch, polymer, organic material, or a combination thereof in such a manner that the sacrificial material resides between surfaces of particles of solid electrode active material and the graphene sheets, and the method further contains a step of partially or completely removing the sacrificial material to form additional empty spaces between surfaces of the solid electrode active material particles and the graphene sheets.

In some embodiments, the method further comprises a step of exposing the graphene-embraced electrode active material to a liquid or vapor of a conductive material that is conductive to electrons and/or ions of lithium.

The particles of anode active material may be selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; and combinations thereof.

In some embodiments, the anode active material particles include powder, flakes, beads, pellets, spheres, wires, fibers, filaments, discs, ribbons, or rods, having a diameter or thickness from 2 nm to 20 μm. Preferably, the diameter or thickness is from 10 nm to 100 nm.

In the invented method, the graphitic material may be selected from natural graphite, synthetic graphite, highly oriented pyrolytic graphite, graphite fiber, graphitic nanofiber, graphite fluoride, chemically modified graphite, mesocarbon microbead, partially crystalline graphite, or a combination thereof.

The method energy impacting apparatus may be a vibratory ball mill, planetary ball mill, high energy mill, basket mill, agitator ball mill, cryogenic ball mill, microball mill, tumbler ball mill, continuous ball mill, stirred ball mill, pressurized ball mill, plasma-assisted ball mill, attritor, freezer mill, vibratory sieve, bead mill, nanobead mill, ultrasonic homogenizer mill, centrifugal planetary mixer, vacuum ball mill, or resonant acoustic mixer. The procedure of operating the energy impacting apparatus may be conducted in a continuous manner using a continuous energy impacting device.

In the graphene-embraced electrode active material particles, the graphene sheets contain single-layer graphene sheets. In some embodiments, the graphene sheets contain at least 80% single-layer graphene or at least 80% few-layer graphene having no greater than 10 graphene planes.

The impacting chamber may further contain a functionalizing agent and step (b) of operating the energy impacting apparatus acts to chemically functionalize said graphene sheets with said functionalizing agent. The functionalizing agent may contain a chemical functional group selected from alkyl or aryl silane, alkyl or aralkyl group, hydroxyl group, carboxyl group, amine group, sulfonate group ($—SO_3H$), aldehydic group, quinoidal, fluorocarbon, or a combination thereof.

In some embodiments, the functionalizing agent contains an oxygenated group selected from the group consisting of hydroxyl, peroxide, ether, keto, and aldehyde. In some embodiments, the functionalizing agent contains a functional group selected from the group consisting of $SO_3H$, COOH, $NH_2$, OH, R'CHOH, CHO, CN, COCl, halide, COSH, SH, COOR', SR', SiR'$_3$, Si(—OR'—)$_y$R'$_3$-y, Si(—O—SiR'$_2$—)OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkyleether), R" is fluoroalkyl, fluoroaryl, fluorocycloalkyl, fluoroaralkyl or cycloaryl, X is halide, and Z is carboxylate or trifluoroacetate, and combinations thereof.

In some embodiments, the functionalizing agent contains a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The functionalizing agent may contain a functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

The present invention also provides a powder mass of graphene-embraced, carbon foam-protected particles of anode active material produced by the aforementioned method, wherein the graphene proportion is from 0.01% to 20% by weight based on the total weight of graphene, carbon foam, and solid anode active material particles combined.

It may be noted that the graphene production step per se (peeling off graphene sheets directly from graphite particles and immediately or concurrently transferring these graphene sheets to electrode active material particle surfaces) is quite surprising, considering the fact that prior researchers and manufacturers have focused on more complex, time intensive and costly methods to create graphene in industrial quantities. In other words, it has been generally believed that chemical intercalation and oxidation is needed to produce bulk quantities of isolated graphene sheets (NGPs). The present invention defies this expectation in many ways:

1. Unlike the chemical intercalation and oxidation (which requires expansion of inter-graphene spaces, further expansion or exfoliation of graphene planes, and full separation of exfoliated graphene sheets), the instant method directly removes graphene sheets from a source graphitic material and transfers these graphene sheets to surfaces of electrode active material particles. No undesirable chemicals (e.g. sulfuric acid and nitric acid) are used.
2. Unlike oxidation and intercalation, pristine graphene sheets can be transferred onto the polymer-coated electrode active material. The sheets being free of oxidation damage allow the creation of graphene-encapsulated particle products with higher electrical and thermal conductivity.
3. Contrary to common production methods, a washing process requiring substantial amounts of water or solvent is not needed.
4. Unlike bottom up production methods capable of producing small graphene sheets, large graphene sheets can be produced with the instant method.
5. Unlike CVD and solution-based metalorganic production methods, elevated temperatures are not required to reduce graphene oxide to graphene and metalorganic compounds to pure metal. This greatly reduces the opportunity for undesirable diffusion of carbon into the electrode active material.
6. Unlike CVD and solution-based metalorganic production methods, this process is amenable to almost any electrode active material. The electrode active material does not need to be a compatible "template" or catalyst, as is required for the CVD process.
7. This method allows the creation of continuous, interpenetrating three dimensional networks of graphene sheets and porous carbon structure.
8. The present invention is amenable to industrial scale production in a continuous energy impact device.

DETAILED DESCRIPTION OF PREFERRED EMBODIMENTS

A lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

Figure 2A:
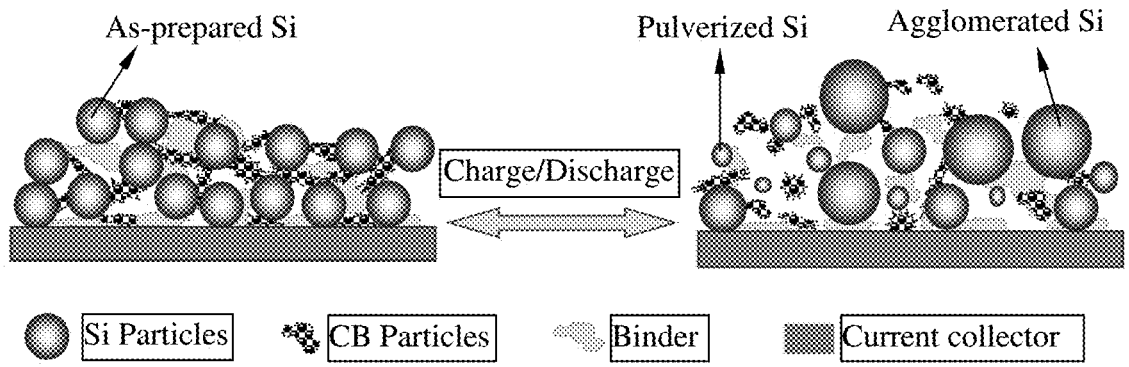
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.
Figure 2B:
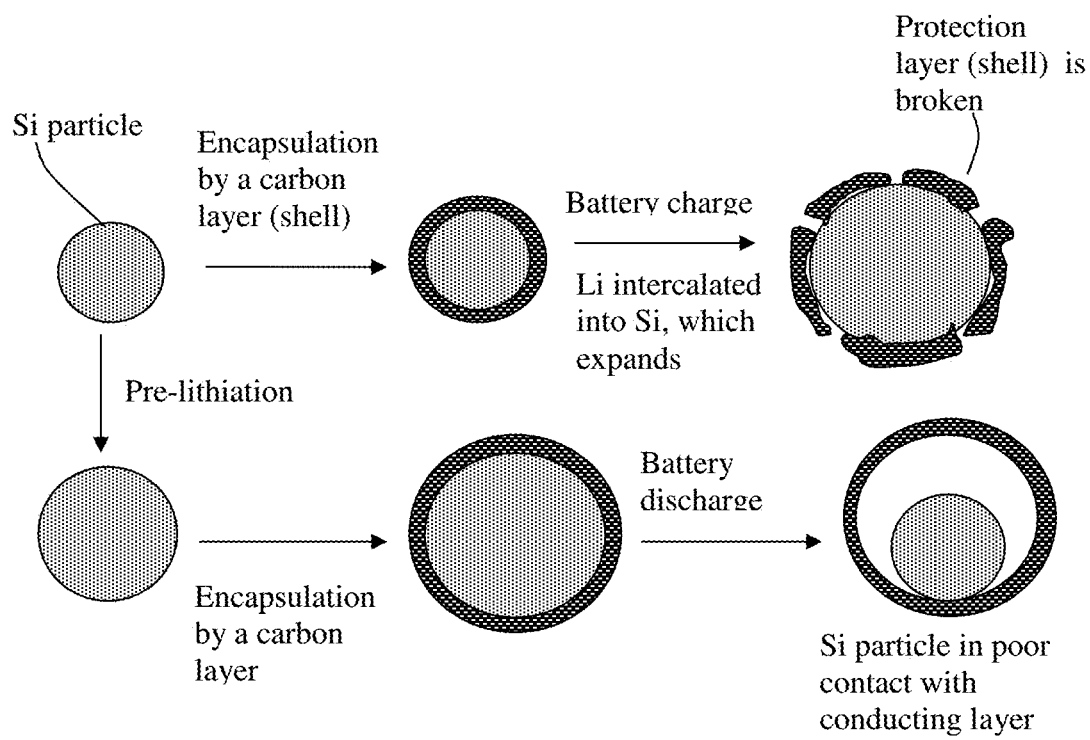
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a prelithiated Si particle encapsulated with a protective layer leads to poor contact between the contracted Si particle and the rigid protective shell during battery discharge.

In order to obtain a higher energy density cell, the anode can be designed to contain higher-capacity anode active materials having a composition formula of $Li_aA$ (A is a metal or semiconductor element, such as Al and Si, and "a" satisfies 0<a≤5). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.
2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/or brittleness of the protective coating materials. There has been no high-strength and high-toughness material available that is itself also lithium ion conductive.
3) The approach of using a core-shell structure (e.g. Si nanoparticle encapsulated in a carbon or $SiO_2$ shell) also has not solved the capacity decay issue. As illustrated in upper portion of FIG. 2(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.
4) Referring to the lower portion of FIG. 2(B), wherein the Si particle has been prelithiated with lithium ions; i.e. has been pre-expanded in volume. When a layer of carbon (as an example of a protective material) is encapsulated around the prelithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these conflicting problems. We have solved these challenging issues that have troubled battery designers and electrochemists alike for more than 30 years by developing the approach of graphene-encapsulated highly porous carbon structure particulates (secondary particles) each comprising one or multiple primary particles of an anode active material dispersed in the porous carbon structure (or carbon foam). The pores in the carbon foam can accommodate the volume expansion of the primary particle(s) of the anode active material. The presence of embracing graphene sheets enables the formation of a porous carbon structure between these graphene sheets and primary anode particles (e.g. Si and $SiO_x$ particles, 0<x<2.0), derived from carbonization of the polymer matrix or coating that embeds the anode primary particles. Surprisingly, without these externally wrapped graphene sheets, the polymer coating or matrix tends to form solid (relatively pore-free) carbon material when the polymer is pyrolyzed.

The present invention provides an anode electrode comprising multiple particulates (secondary particles) of an anode active material (plus an optional resin binder and/or an optional conductive additive in the electrode), wherein at least a particulate (secondary particle) comprises a graphene shell and a carbon foam core, wherein the carbon foam core contains one or a plurality of primary particles of an anode active material residing in pores of the carbon foam. The encapsulating shell (graphene sheets, typically also bonded by carbon converted from a polymer) that has a thickness from 1 nm to 10 μm (preferably from 1 nm to 100 nm). The total anode active material particle volume is Va and the pores in the carbon foam core have a total volume Vp, wherein the Vp/Va ratio is preferably and typically from 0.3/1.0 to 5.0/1.0 (preferably from 0.5/1.0 to 4.0/1.0).

This encapsulating shell may contain just the graphene sheets alone without using a resin binder or matrix. Alternatively, the graphene sheets may be bonded by a binder (e.g. a resin or carbon binder) or dispersed in a resin or carbon matrix. Preferably, the encapsulating shell has a thickness from 1 nm to 10 μm (preferably less than 100 nm and most preferably <10 nm), and a lithium ion conductivity from $10^{-8}$ S/cm to $10^{-2}$ S/cm (more typically from $10^{-5}$ S/cm to $10^{-3}$ S/cm). The encapsulating shell preferably has an electrical conductivity from $10^{-7}$ S/cm to 3,000 S/cm, up to 20,000 S/cm (more typically from $10^{-4}$ S/cm to 1000 S/cm) when measured at room temperature on a separate cast thin film 20 μm thick. Preferably, the anode active material is a high-capacity anode active material having a specific lithium storage capacity greater than 372 mAh/g (which is the theoretical capacity of graphite).

If a single primary particle is encapsulated, the single primary particle is surrounded by a shell or matrix of porous carbon having a free space to expand into without straining the thin encapsulating graphene layer when the resulting lithium battery is charged. The pores or empty space in the surrounding carbon foam allow the particle to expand into the free space without an overall volume increase of the particulate and without inducing any significant volume expansion of the entire anode electrode.

This amount of pore volume inside the particulate (in the porous carbon core portion, not the shell portion) provides empty space to accommodate the volume expansion of the anode active material so that the thin encapsulating layer would not significantly expand (not to exceed 50% volume expansion of the particulate) when the lithium battery is charged. Preferably, the particulate does not increase its volume by more than 20%, further preferably less than 10% and most preferably by approximately 0% when the lithium battery is charged. Such a constrained volume expansion of the particulate would not only reduce or eliminate the volume expansion of the anode electrode but also reduce or eliminate the issue of repeated formation and destruction of a solid-electrolyte interface (SEI) phase. We have discovered that this strategy surprisingly results in significantly reduced battery capacity decay rate and dramatically increased charge/discharge cycle numbers. These results are unexpected and highly significant with great utility value.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nanofiber. In other words, graphene planes (hexagonal lattice structure of carbon atoms) constitute a significant portion of a graphite particle.

One preferred specific embodiment of the present invention is a method of peeling off graphene planes of carbon atoms (1-10 planes of atoms that constitute single-layer or few-layer graphene sheets) that are directly transferred to surfaces of electrode active material particles. A graphene sheet or nanographene platelet (NGP) is essentially composed of a sheet of graphene plane or multiple sheets of graphene plane stacked and bonded together (typically, on an average, less than 10 sheets per multi-layer platelet). Each graphene plane, also referred to as a graphene sheet or a hexagonal basal plane, comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. However, the NGPs produced with the instant methods are mostly single-layer graphene and some few-layer graphene sheets (<10 layers). The length and width of a NGP are typically between 200 nm and 20 μm, but could be longer or shorter, depending upon the sizes of source graphite material particles.

The present invention provides a strikingly simple, fast, scalable, environmentally benign, and cost-effective process that avoids essentially all of the drawbacks associated with prior art processes of producing graphene sheets and obviates the need to execute a separate (additional) process to combine the produced graphene sheets and particles of an anode active material together to form a protected composite or hybrid electrode active material.

Figure 3:
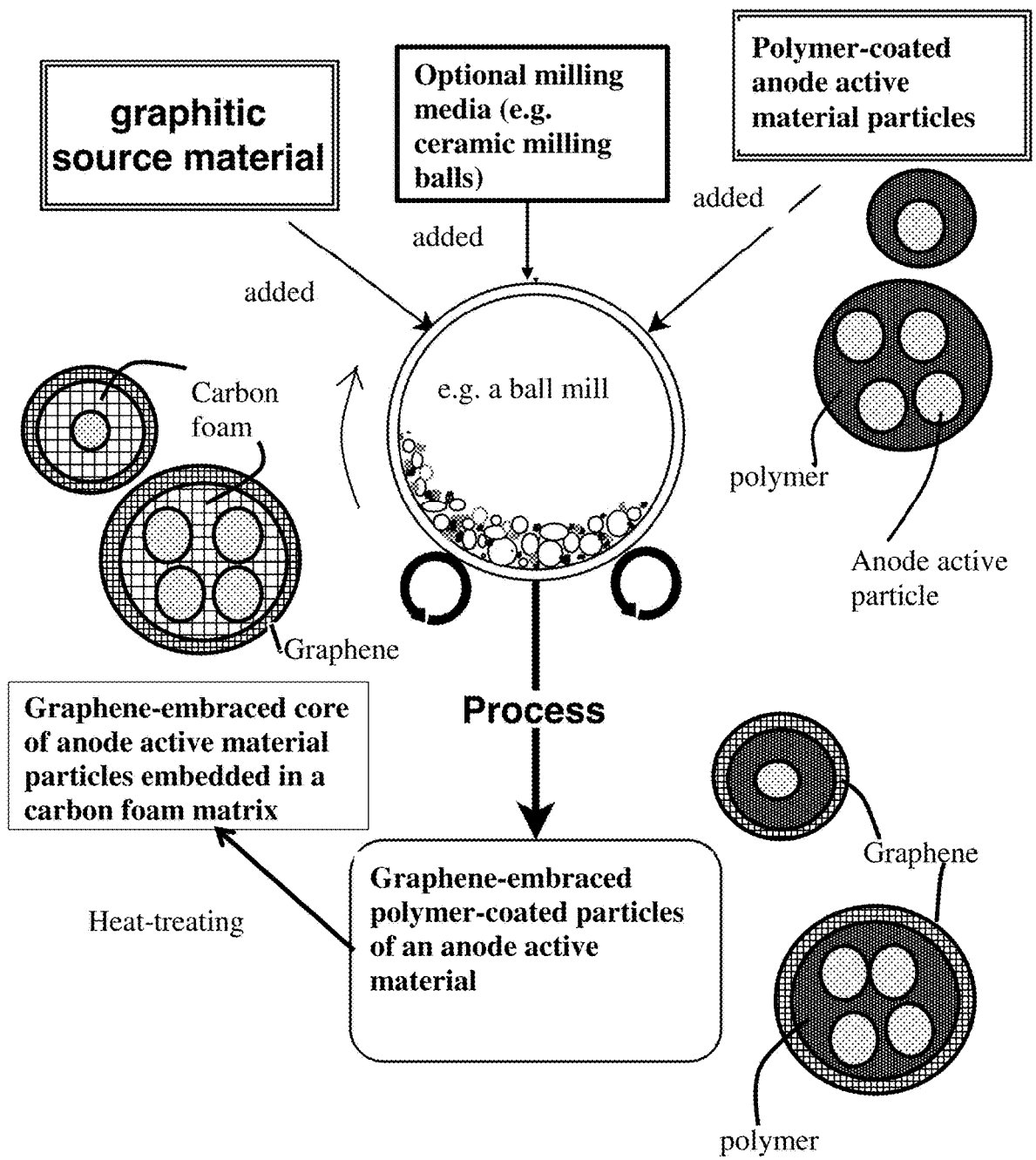
FIG. 3 A diagram showing the presently invented process for producing graphene-embraced, carbon foam-protected anode active material particles via an energy impacting apparatus.

As schematically illustrated in FIG. 3, one embodiment of this method entails placing particles of a source graphitic material, polymer-embraced or polymer-coated particles of a solid anode active material (i.e. one or a plurality of anode active material particles are embraced by a polymer coating or embedded in a polymer matrix), and optional impacting balls (particles of ball-milling media) in an impacting chamber. After loading, the resulting mixture is exposed to impacting energy, which is accomplished, for instance, by rotating the chamber to enable the impacting of the milling balls against graphite particles. These repeated impacting events (occurring in high frequencies and high intensity) act to peel off graphene sheets from the surfaces of graphitic material particles and tentatively transferred to the surfaces of these impacting balls first. When the graphene-coated impacting balls subsequently impinge upon the polymer-protected solid anode active material particles, the graphene sheets are transferred to surfaces of the polymer-protected anode active material particles to form graphene-coated, polymer-protected active material particles. Typically, the entire polymer-protected particle is covered by graphene sheets (fully wrapped around, embraced or encapsulated). Subsequently, the externally added impacting balls (e.g. ball-milling media) are separated from the graphene-embraced particles.

In this version of the invented method, externally added milling balls are used and the peeled-off graphene sheets can be transferred to the milling ball surfaces first and then subsequently transferred to surfaces of polymer-protected anode active material particles. As such, this process is herein referred to as the "indirect transfer process."

The particles of ball-milling media may contain milling balls selected from ceramic particles (e.g. $ZrO_2$ or non- $ZrO_2$-based metal oxide particles), metal particles, polymer beads, glass particles, or a combination thereof.

One preferred embodiment of this method entails placing source graphitic material particles, an optional oxidizing agent and/or chemical functionalization agent (if so desired), and solid polymer-protected anode particles (but without externally added impacting balls) in an impacting chamber. After loading, the resulting mixture is immediately exposed to impacting energy, which is accomplished by rotating the chamber to enable the impacting of the solid polymer-protected anode particles (no externally added impacting balls being present inside the chamber) against graphite particles. These repeated impacting events (occurring in high frequencies and high intensity) act to peel off graphene sheets from the surfaces of graphitic material particles and directly transfer these graphene sheets to the surfaces of polymer-protected anode particles to produce the graphene-encapsulated, polymer-protected anode active material particles. This is the "direct transfer process."

In less than two hours (often less than 1 hour) of operating the direct transfer process, most of the constituent graphene sheets of source graphite particles are peeled off, forming mostly single-layer graphene and few-layer graphene (mostly less than 5 layers or 5 graphene planes). Following the transfer process (graphene sheets wrapped around polymer-protected active material particles), the residual graphite particles (if present) are separated from the graphene-embraced (graphene-encapsulated) polymer-protected particles using a broad array of methods. Separation or classification of graphene-embraced (graphene-encapsulated) particles from residual graphite particles (if any) can be readily accomplished based on their differences in weight or density, particle sizes, magnetic properties, etc. The resulting graphene-embraced polymer-protected particles are already a two-component material; i.e. they are already "mixed" and there is no need to have a separate process of mixing isolated graphene sheets with polymer-protected anode active material particles.

In other words, production of graphene sheets and mixing of graphene sheets with an electrode active material are essentially accomplished concurrently in one operation. This is in stark contrast to the traditional processes of producing graphene sheets first and then subsequently mixing the graphene sheets with an active material. Traditional dry mixing typically does not result in homogeneous mixing or dispersion of two or multiple components. It is also challenging to properly disperse nanomaterials in a solvent to form a battery slurry mass for coating on a current collector.

The resulting graphene-embraced polymer-protected particles are then subjected to a heat treatment to carbonize the polymer component and convert polymer into a porous carbon structure or carbon foam. The encapsulating graphene sheets appear to actively promote the formation of a foamed carbon structure, rather than a solid carbon structure, surrounding the anode active material particles.

In certain preferred embodiments, the protecting polymer (the polymer that is embedded with anode active material particles or the polymer that coats/embraces the anode active material particles) contains a blowing agent (foaming agent).

A blowing agent or foaming agent is a substance which is capable of producing a cellular or foamed structure via a foaming or pore-forming process in a variety of materials that undergo hardening or phase transition, such as polymers (plastics and rubbers). Blowing agents or related pore-forming mechanisms to create pores or cells (bubbles) in a structure for producing a porous or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices.

We have found that the above four mechanisms can all be used to create pores in the protecting polymer.

Figure 1:
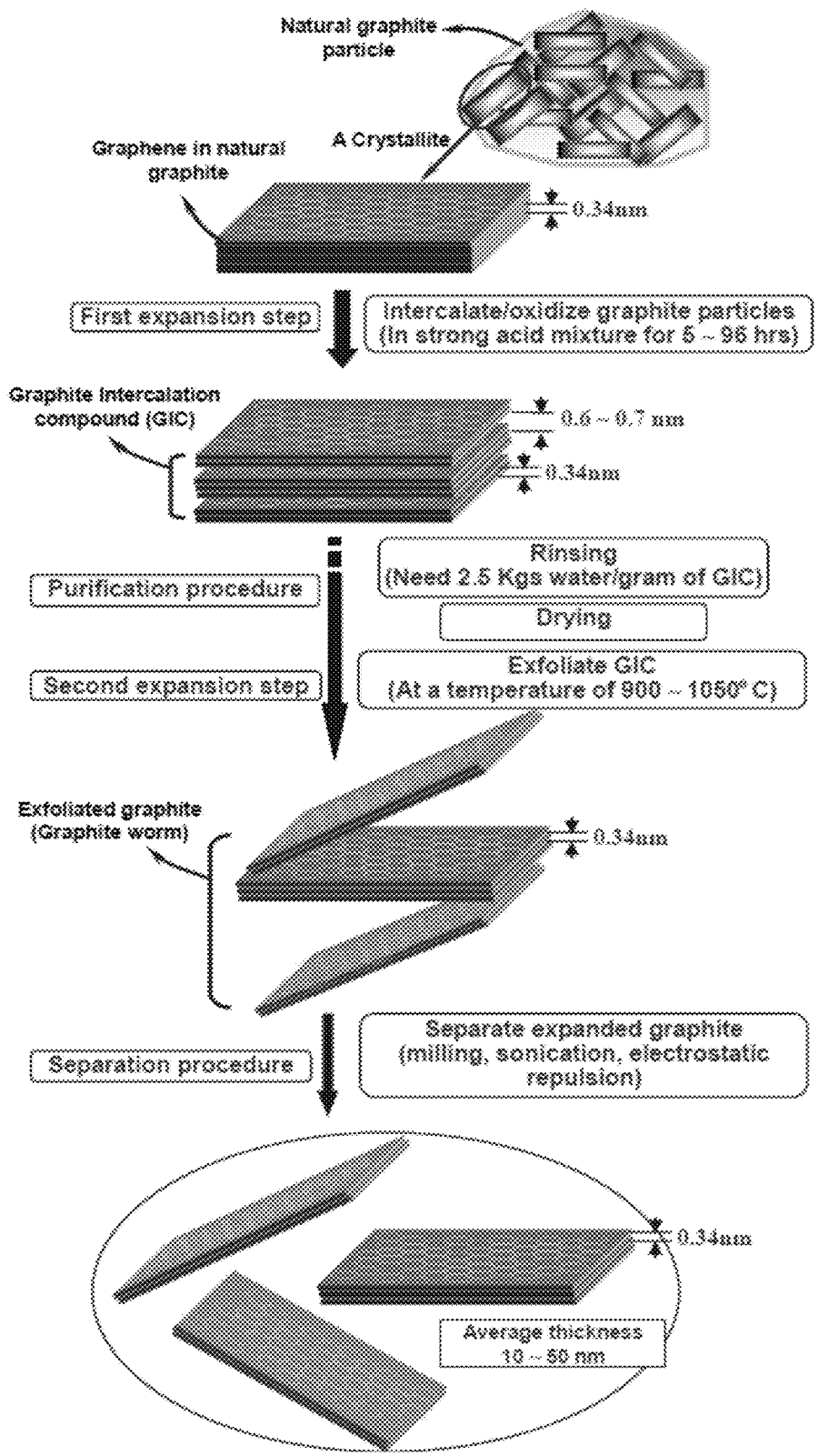
FIG. 1 A flow chart showing the most commonly used prior art process of producing highly oxidized graphene sheets (or nanographene platelets, NGPs) that entails tedious chemical oxidation/intercalation, rinsing, and high-temperature exfoliation procedures.

As shown in FIG. 1, the prior art chemical processes for producing graphene sheets or platelets alone typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO). RGO is found to contain a high defect population and, hence, is not as conducting as pristine graphene. We have observed that that the pristine graphene paper (prepared by vacuum-assisted filtration of pristine graphene sheets, as herein prepared) exhibit electrical conductivity values in the range from 1,500-4,500 S/cm. In contrast, the RGO paper prepared by the same paper-making procedure typically exhibits electrical conductivity values in the range from 100-1,000 S/cm.

In the most common implementation of prior art ball mill mixing, previously produced graphene sheets or platelets are added to electrode active material powders. Impact energy is applied via ball mill for a period of time to disperse graphene platelets or sheets in the powder. This is often carried out in a liquid (solvent) solution. The disadvantages of this graphene/active material mixing process are obvious—previously made graphene is a costly input material, solvent recovery is required, and most significantly, the graphene input into the process has been damaged by oxidation during prior processing. This reduces desirable end properties, such as thermal conductivity and electrical conductivity.

Another prior art process is coating of CVD graphene onto metal nanoparticles. This is the most limited of all prior art methods, being possible only on certain metals that are suitable catalysts for facilitating decomposition of hydrocarbon gas to form carbon atoms and as templates for graphene to grow on. As a "bottom up" graphene production method, it requires costly capital equipment and costly input materials.

In all these prior art processes for producing graphene-coated electrode active material particles, isolated graphene sheets and particles of the active material are dispersed in a solvent (e.g. NMP) to form a slurry. The slurry is then dried (e.g. using spray drying) to form graphene-active material composite particles. These composites do not necessarily have the morphology or structure of active material particles being fully wrapped around or embraced.

In contrast, the presently invented impacting process entails combining graphene production, functionalization (if desired), and mixing of graphene with electrode active material particles in a single operation. This fast and environmentally benign process not only avoids significant chemical usage, but also produces embracing graphene sheets of higher quality—pristine graphene as opposed to thermally reduced graphene oxide produced by the prior art process. Pristine graphene enables the creation of embraced particles with higher electrical and thermal conductivity.

Although the mechanisms remain incompletely understood, this revolutionary process of the present invention has essentially eliminated the conventionally required functions of graphene plane expansion, intercalant penetration, exfoliation, and separation of graphene sheets and replace it with a single, entirely mechanical peeling process. The whole process can take less than 2 hours (typically 10 minutes to 1 hour), and can be done with no added chemicals. This is absolutely stunning, a shocking surprise to even those top scientists and engineers or those of extraordinary ability in the art.

Another surprising result of the present study is the observation that a wide variety of carbonaceous and graphitic materials can be directly processed without any particle size reduction or pre-treatment. The particle size of graphite can be smaller than, comparable to, or larger than the particle size of the electrode active material. The graphitic material may be selected from natural graphite, synthetic graphite, highly oriented pyrolytic graphite, mesocarbon microbead, graphite fiber, graphitic nanofiber, graphite oxide, graphite fluoride, chemically modified graphite, exfoliated graphite, or a combination thereof. It may be noted that the graphitic material used for the prior art chemical production and reduction of graphene oxide requires size reduction to 75 um or less in average particle size. This process requires size reduction equipment (for example hammer mills or screening mills), energy input, and dust mitigation. By contrast, the energy impacting device method can accept almost any size of graphitic material. A starting graphitic material of several mm or cm in size or larger or a starting material as small as nanoscaled has been successfully processed to create graphene-coated or graphene-embedded particles of cathode or anode active materials. The only size limitation is the chamber capacity of the energy impacting device; but this chamber can be very large (industry-scaled).

The presently invented process is capable of producing single-layer graphene sheets that completely wrap around the particles of an electrode active material. In many examples, the graphene sheets produced contain at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content of no less than 95% by weight, or functionalized graphene.

The presently invented process does not involve the production of GIC and, hence, does not require the exfoliation of GIC at a high exfoliation temperature (e.g. 800-1,100° C.). This is another major advantage from environmental protection perspective. The prior art processes require the preparation of dried GICs containing sulfuric acid and nitric acid intentionally implemented in the inter-graphene spaces and, hence, necessarily involve the decomposition of $H_2SO_4$ and $HNO_3$ to produce volatile gases (e.g. $NO_x$ and $SO_x$) that are highly regulated environmental hazards. The presently invented process completely obviates the need to decompose $H_2SO_4$ and $HNO_3$ and, hence, is environmentally benign. No undesirable gases are released into the atmosphere during the combined graphite expansion/exfoliation/separation process of the present invention.

Figure 4:
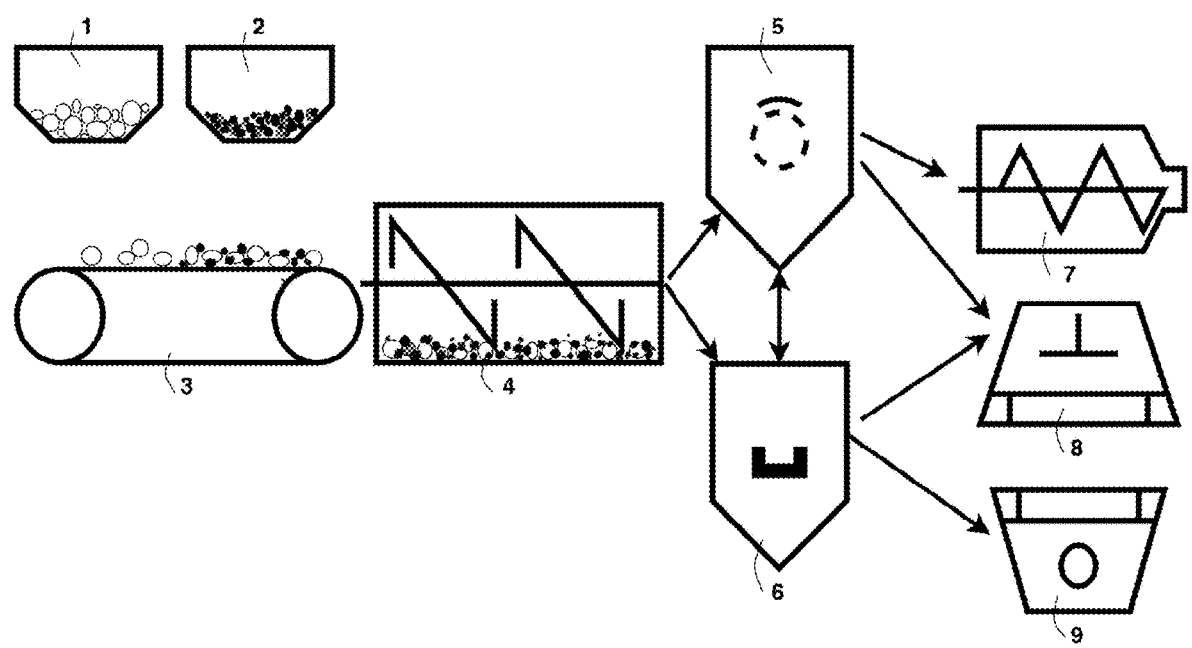
FIG. 4 A diagram showing the presently invented process for producing graphene-embraced, polymer-coated electrode active material particles via a continuous ball mill.

In a desired embodiment, the presently invented method is carried out in an automated and/or continuous manner. For instance, as illustrated in FIG. 4, the mixture of graphite particles 1 and polymer-protected electrode active material particles 2 (along with optional milling balls) is delivered by a conveyer belt 3 and fed into a continuous ball mill 4. After ball milling to form graphene-embraced polymer-protected particles, the product mixture (possibly also containing some residual graphite particles) is discharged from the ball mill apparatus 4 into a screening device (e.g. a rotary drum 5) to separate graphene-embraced polymer-protected particles from residual graphite particles (if any). The graphene-embraced polymer-protected particles may be delivered into a powder classifier, a cyclone, and or an electrostatic separator. The particles may be further processed, if so desired, by melting 7, pressing 8, or grinding/pelletizing apparatus 9. These procedures can be fully automated. The process may include characterization or classification of the output material and recycling of insufficiently processed material into the continuous energy impacting device. The process may include weight monitoring of the load in the continuous energy impacting device to optimize material properties and throughput.

The separation of the milling balls, if any, from the final products may be assisted by a magnetic separator 6 if the milling balls are ferromagnetic (e.g. containing Fe, Co, Ni, or Mn-based metal in some desired electronic configuration).

The polymer-protected anode active materials that are placed into the impacting chamber can contain those materials capable of storing lithium ions greater than 372 mAh/g, theoretical capacity of natural graphite. Examples of these high-capacity anode active materials are Si, Ge, Sn, $SnO_2$, $SiO_x$, $Co_3O_4$, etc. As discussed earlier, these materials, if implemented in the anode, have the tendency to expand and contract when the battery is charged and discharged. At the electrode level, the expansion and contraction of the anode active material can lead to expansion and contraction of the anode, causing mechanical instability of the battery cell. At the anode active material level, repeated expansion/contraction of particles of Si, Ge, Sn, $SiO_x$, $SnO_2$, $Co_3O_4$, etc. quickly leads to pulverization of these particles and rapid capacity decay of the electrode.

Thus, for the purpose of addressing these problems, the particles of solid anode active material may contain prelithiated particles. In other words, before the electrode active material particles (such as Si, Ge, Sn, $SnO_2$, $Co_3O_4$, etc.) are embedded in a polymer matrix (or encapsulated by a polymer coating) and then embraced by graphene sheets, these particles have already been previously intercalated with Li ions (e.g. via electrochemical charging).

In some embodiments, prior to the instant graphene production and impact transfer and embracing process, the particles of anode electrode active material contain particles that are pre-coated with a coating of a conductive material selected from carbon, pitch, carbonized resin, a conductive polymer, a conductive organic material, a graphene coating (e.g. graphene sheets), a metal coating, a metal oxide shell, or a combination thereof. The coating layer thickness is preferably in the range from 1 nm to 10 µm, preferably from 2 nm to 1 µm, and further preferably from 5 nm to 100 nm. This coating is implemented for the purpose of establishing a stable solid-electrolyte interface (SEI) to increase the useful cycle life of a lithium-ion battery. Coating of graphene sheets on anode active material particles may be accomplished by using a similarly configured impact transfer process (direct transfer or indirect transfer) as described above for the polymer-protected particles.

In some embodiments, the particles of solid anode active material contain particles that are, prior to being coated with the protecting polymer, pre-coated with a carbon precursor material selected from a coal tar pitch, petroleum pitch, mesophase pitch, polymer, organic material, or a combination thereof so that the carbon precursor material resides between surfaces of the solid electrode active material particles and the graphene sheets, and the method further contains a step of heat-treating the graphene-embraced electrode active material to convert the carbon precursor material to a carbon material and pores, wherein the pores form empty spaces between surfaces of the solid electrode active material particles and the graphene sheets and the carbon material is coated on the surfaces of solid electrode active material particles and/or chemically bonds the graphene sheets together. The carbon material helps to completely seal off the embracing graphene sheets to prevent direct contact of the embraced anode active material with liquid electrolyte, which otherwise continues to form additional SEI via continuously consuming the lithium ions or solvent in the electrolyte, leading to rapid capacity decay.

In some embodiments, the particles of solid electrode active material contain particles pre-coated with a sacrificial material selected from a metal, pitch, polymer, organic material, or a combination thereof in such a manner that the sacrificial material resides between surfaces of solid electrode active material particles and the graphene sheets, and the method further contains a step of partially or completely removing the sacrificial material to form empty spaces between surfaces of the solid electrode active material particles and the graphene sheets. The empty spaces can accommodate the expansion of embraced active material particles without breaking the embraced particles.

In some embodiments, the method further comprises a step of exposing the graphene-embraced carbon foam-protected anode active material to a liquid or vapor of a conductive material that is conductive to electrons and/or ions of lithium, sodium, magnesium, aluminum, or zinc. This procedure serves to provide a stable SEI or to make the SEI more stable.

The particles of anode active material may be selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; and combinations thereof.

Anode active material particles may be encapsulated by using a micro-encapsulation procedure. The volume ratio of polymer-to-anode active material may be preferably from 0.3/1.0 to 5.0/1.0 and more preferably from 0.5/1.0 to 4.0/1.0.

Several micro-encapsulation processes require the polymer (e.g. elastomer prior to curing) to be dissolvable in a solvent. Fortunately, all the polymers used herein are soluble in some common solvents. Even for those rubbers that are not very soluble after vulcanization, the un-cured polymer (prior to vulcanization or curing) can be readily dissolved in a common organic solvent to form a solution. This solution can then be used to provide a polymer coating or matrix to embrace or embed therein the anode active particles via several of the micro-encapsulation methods to be discussed in what follows. Upon encapsulation, the polymer is then vulcanized or cured. Some examples of rubbers and their solvents are polybutadiene (2-methyl pentane+n-hexane or 2,3-dimethylbutane), styrene-butadiene rubber (toluene, benzene, etc.), butyl rubber (n-hexane, toluene, cyclohexane), etc. The SBR can be vulcanized with different amounts of sulfur and accelerator at 433° K in order to obtain different network structures and crosslink densities. Butyl rubber (IIR) is a copolymer of isobutylene and a small amount of isoprene (e.g. about 98% polyisobutylene with 2% isoprene distributed randomly in the polymer chain). Elemental sulfur and organic accelerators (such as thiuram or thiocarbamates) can be used to cross-link butyl rubber to different extents as desired. Thermoplastic elastomers are also readily soluble in solvents.

There are three broad categories of micro-encapsulation methods that can be implemented to produce polymer composite-encapsulated particles of an anode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-Coating Method:

The pan coating process involves tumbling the active material particles in a pan or a similar device while the encapsulating material (e.g. elastomer monomer/oligomer, polymer melt, polymer/solvent solution) is applied slowly until a desired encapsulating shell thickness is attained.

Air-Suspension Coating Method:

In the air suspension coating process, the solid particles (core material) are dispersed into the supporting air stream in an encapsulating chamber. A controlled stream of a polymer-solvent solution (e.g. elastomer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with polymers while the volatile solvent is removed, leaving a thin layer of polymer (e.g. elastomer or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal Extrusion:

Anode active materials may be encapsulated using a rotating extrusion head containing concentric nozzles. In this process, a stream of core fluid (slurry containing particles of an anode active material dispersed in a solvent) is surrounded by a sheath of shell solution or melt. The suspension may also contain a conducting reinforcement material. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational Nozzle Encapsulation Method:

Core-shell encapsulation or matrix-encapsulation of an anode active material (along with a reinforcement material, for instance) can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry).

Spray-Drying:

Spray drying may be used to encapsulate particles of an active material when the active material is dissolved or suspended in a melt or polymer solution to form a suspension. The suspension may also contain an optional reinforcement material. In spray drying, the liquid feed (solution or suspension) is atomized to form droplets which, upon contacts with hot gas, allow solvent to get vaporized and thin polymer shell to fully embrace the solid particles of the active material.

Coacervation-Phase Separation:

This process consists of three steps carried out under continuous agitation:

(a) Formation of three immiscible chemical phases: liquid manufacturing vehicle phase, core material phase and encapsulation material phase. The core material is dispersed in a solution of the encapsulating polymer (elastomer or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.

(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and (c) Hardening of encapsulating shell material: shell material being immiscible in vehicle phase and made rigid via thermal, cross-linking, or dissolution techniques.

Interfacial Polycondensation and Interfacial Cross-Linking:

Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-Situ Polymerization:

In some micro-encapsulation processes, active materials particles are fully coated with a monomer or oligomer first. Then, direct polymerization of the monomer or oligomer is carried out on the surfaces of these material particles.

Matrix Polymerization:

This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

Extrusion and Pelletizing:

One may simply mix anode active material particles (with or without graphene sheets or other conducting material pre-embraced around the particles) and polymer together (through blending, melt mixing, or solution mixing) to form a mixture that is extruded out of an extruder slit or spinneret holes to form rods or filaments of an anode particle-embedded polymer composite. Upon solidification, the composite rods or filaments may be cut into smaller particles using pelletizer, ball mill, etc.

In some embodiments, the electrode active material particles include powder, flakes, beads, pellets, spheres, wires, fibers, filaments, discs, ribbons, or rods, having a diameter or thickness from 2 nm to 20 μm. Preferably, the diameter or thickness is from 10 nm to 100 nm.

In the invented method, the graphitic material may be selected from natural graphite, synthetic graphite, highly oriented pyrolytic graphite, graphite fiber, graphitic nanofiber, graphite fluoride, chemically modified graphite, mesocarbon microbead, partially crystalline graphite, or a combination thereof.

The energy impacting apparatus may be a vibratory ball mill, planetary ball mill, high energy mill, basket mill, agitator ball mill, cryogenic ball mill, microball mill, tumbler ball mill, continuous ball mill, stirred ball mill, pressurized ball mill, plasma-assisted ball mill, freezer mill, vibratory sieve, bead mill, nanobead mill, ultrasonic homogenizer mill, centrifugal planetary mixer, vacuum ball mill, or resonant acoustic mixer. The procedure of operating the energy impacting apparatus may be conducted in a continuous manner using a continuous energy impacting device Graphene sheets transferred to electrode active material surfaces have a significant proportion of surfaces that correspond to the edge planes of graphite crystals. The carbon atoms at the edge planes are reactive and must contain some heteroatom or group to satisfy carbon valency. There are many types of functional groups (e.g. hydroxyl and carboxylic) that are naturally present at the edge or surface of graphene nanoplatelets produced through transfer to a solid carrier particle. The impact-induced kinetic energy is of sufficient energy and intensity to chemically activate the edges and even surfaces of graphene sheets embraced around active material particles (e.g. creating highly active sites or free radicals). Provided that certain chemical species containing desired chemical function groups (e.g. OH—, —COOH, —NH$_2$, Br—, etc.) are included in the impacting chamber, these functional groups can be imparted to graphene edges and/or surfaces. In other words, production and chemical functionalization of graphene sheets can be accomplished concurrently by including appropriate chemical compounds in the impacting chamber. In summary, a major advantage of the present invention over other processes is the simplicity of simultaneous production and modification of graphene surface chemistry for improved battery performance.

Graphene sheets derived by this process may be functionalized through the inclusion of various chemical species in the impacting chamber. In each group of chemical species discussed below, we selected 2 or 3 chemical species for functionalization studies.

In one preferred group of chemical agents, the resulting functionalized NGP may broadly have the following formula(e): [NGP]—R$_m$, wherein m is the number of different functional group types (typically between 1 and 5), R is selected from SO$_3$H, COOH, NH$_2$, OH, R'CHOH, CHO, CN, COCl, halide, COSH, SH, COOR', SR', SiR'$_3$, Si(—OR'—)$_y$R'$_{3-y}$, Si(—O—SiR'$_2$—)OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

Graphene-embraced electrode active material particles may be used to improve the mechanical properties, electrical conductivity and thermal conductivity of an electrode. For enhanced lithium-capturing and storing capability, the functional group —NH$_2$ and —OH are of particular interest. For example, diethylenetriamine (DETA) has three —NH$_2$ groups. If DETA is included in the impacting chamber, one of the three —NH$_2$ groups may be bonded to the edge or surface of a graphene sheet and the remaining two unreacted —NH$_2$ groups will be available for reversibly capturing a lithium or sodium atom and forming a redox pair therewith. Such an arrangement provides an additional mechanism for storing lithium or sodium ions in a battery electrode.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin material at one or two other ends.

The above-described [NGP]-R$_m$ may be further functionalized. This can be conducted by opening up the lid of an impacting chamber after the —R$_m$ groups have been attached to graphene sheets and then adding the new functionalizing agents to the impacting chamber and resuming the impacting operation. The resulting graphene sheets or platelets include compositions of the formula: [NGP]-A$_m$, where A is selected from OY, NHY, O=C—OY, P=C—NR'Y, O=C—SY, O=C—Y, —CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

The NGPs may also be functionalized to produce compositions having the formula: [NGP]-[R'-A]$_m$, where m, R' and A are as defined above. The compositions of the invention also include NGPs upon which certain cyclic compounds are adsorbed. These include compositions of matter of the formula: [NGP]-[X—R$_a$]$_m$, where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]-[X-A$_a$]$_m$, where m, a, X and A are as defined above.

The functionalized NGPs of the instant invention can be prepared by sulfonation, electrophilic addition to deoxygenated platelet surfaces, or metallation. The graphitic platelets can be processed prior to being contacted with a functionalizing agent. Such processing may include dispersing the platelets in a solvent. In some instances the platelets may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphitic platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O- or NH-leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 86, 1839 (1964), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets. Functionalization of the graphene-coated inorganic particles may be used as a method to introduce dopants into the electrode active material.

The following examples serve to provide the best modes of practice for the present invention and should not be construed as limiting the scope of the invention:

Example 1: Various Blowing Agents and Pore-Forming (Bubble-Producing) Processes

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range from 130 to 230° C. (266-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bicarbonate (baking soda), hydrazine, hydrazide, azodicarbonamide (exothermic chemical blowing agents), nitroso compounds (e.g. N, N-Dinitroso pentamethylene tetramine), hydrazine derivatives (e.g. 4, 4'-Oxybis (benzenesulfonyl hydrazide) and Hydrazo dicarbonamide), and hydrogen carbonate (e.g. sodium hydrogen carbonate). These are all commercially available in plastics industry.

Technically feasible blowing agents include Carbon dioxide ($CO_2$), Nitrogen ($N_2$), Isobutane ($C_4H_{10}$), Cyclopentane ($C_5H_{10}$), Isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Except for those regulated substances, all the blowing agents recited above have been tested in our experiments. For both physical blowing agents and chemical blowing agents, the blowing agent amount introduced into the polymer, in terms of a blowing agent-to-polymer material weight ratio, is typically from 0/1.0 to 1.0/1.0, preferably from 0.2/1.0 to 0.8/1.0.

Example 2: Graphene Embraced, Carbon Foam-Protected Particles of Electrode Active Materials Several types of anode active materials in a fine powder form were investigated. These include $Co_3O_4$, Si, Ge, $SiO_x$ (0<x<2), etc., which are used as examples to illustrate the best mode of practice. These active materials were either prepared in house or purchased from commercial sources. Primary particles of an anode active material were then dispersed in a polymer-solvent solution to form a slurry, which was spray-dried to form polymer-protected particulates, each containing one or a plurality of anode active particles embedded in a polymer matrix. The polymer-protected particulates were then subjected to a direct transfer or indirect transfer treatment for graphene sheet encapsulation of polymer-protected particles.

In a typical experiment, 1 kg of polymer-coated electrode active material powder and 100 grams of natural flake graphite, 50 mesh (average particle size 0.18 mm; Asbury Carbons, Asbury N.J.), and milling balls (stainless steel balls, $ZrO_2$ balls, glass balls, and $MoO_2$ balls, etc.) were placed in a high-energy ball mill container or a tumbler ball mill. The tumbler ball mill was operated at 30 rpm for 3 to 8 hours. The high-intensity ball mill was operated at 100 rpm for 0.5 to 3 hours. The container lid was then removed and particles of the active materials were found to be fully coated (embraced or encapsulated) with a dark layer, which was verified to be graphene by Raman spectroscopy. The mass of processed material was placed over a 50 mesh sieve and, in some cases, a small amount of unprocessed flake graphite was removed.

The graphene-embraced, polymer-protected anode particles were then subjected to pyrolyzation at a carbonization temperature from 500-1,200° C.

Example 3: Graphene-Encapsulated, Reinforced Carbon Foam-Protected Sn, $SiO_x$, and Ge Particles The process of Example 2 was replicated with the inclusion of a reinforcement material (high strength material) in the polymer. Examples of the reinforcement material used in this study include graphene oxide sheets, expanded graphite flakes, and CNTs. Primary particles of an anode active material and a reinforcement material were then dispersed in a polymer-solvent solution to form a slurry, which was extruded and pelletized to form polymer composite-protected particulates, each containing one or a plurality of anode active particles embedded in a polymer matrix composite. The polymers used in the present study were water soluble polymers, including polyvinyl pyrrolidone (PVP), polyvinyl alcohol (PVA), and polyacrylic acid (PAA), and the solvent used was water. In the case of PAA, baking soda was used as a blowing agent.

The polymer composite-protected particulates were then subjected to a direct transfer or indirect transfer treatment. The graphene-embraced, polymer composite-protected anode particles were then subjected to pyrolyzation at an initial temperature of 150° C., which was then gradually ramped up to a carbonization temperature from 700-1,500° C.

Example 4: Graphene-Embraced Carbon Foam-Protected $SnO_2$ Particles

In an experiment, 4 grams of phenolic resin-coated tin oxide powder (90 nm diameter), 0.25 grams highly oriented pyrolytic graphite (HOPG), and 1 gram of $ZrO_2$ balls were placed in a resonant acoustic mill and processed for 5 minutes. For comparison, the same experiment was conducted, but without the presence of zirconia milling beads. The direct transfer process (resin-coated tin oxide particles serving as the milling media per se without the externally added zirconia milling beads) led to mostly single-particle particulate (each particulate contains one particle encapsulated by graphene sheets). In contrast, with the presence of externally added milling beads, a graphene-embraced particulate tends to contain some multiple resin-coated tin oxide particles (typically 3-50) wrapped around by graphene sheets. These same results were also observed for most of metal oxide-based electrode active materials.

Example 5: Graphene-Encapsulated Reinforced Carbon Foam-Protected Si Micron Particles In a first experiment, 500 g of graphene oxide-reinforced PVA-protected Si powder (particle diameter ~3 μm), 50 grams of highly oriented pyrolytic graphite (HOPG), and 100 grams of $ZrO_2$ balls were placed in a high-intensity ball mill. The mill was operated for 20 minutes, after which the container lid was opened and un-processed HOPG was removed by a 50 mesh sieve. The resin-coated Si powder was coated with a dark layer, which was verified to be graphene by Raman spectroscopy.

In a second experiment, micron-scaled Si particles from the same batch were pre-coated with a layer of multi-walled CNT reinforced polyethylene (PE) using a micro-encapsulation method that includes preparing solution of PE dissolved in toluene, dispersing Si particles and CNTs in this solution to form a slurry, and spry-drying the slurry to form reinforced PE-encapsulated Si particles. Then, 500 g of CNT-reinforced PE-encapsulated Si particles and 50 grams of HOPG were placed in a high-intensity ball mill. The mill was operated for 20 minutes, after which the container lid was opened and un-processed HOPG was removed by a 50 mesh sieve. The PE-encapsulated Si particles (PE layer varied from 0.3 to 2.0 μm) were now also embraced with graphene sheets. These graphene-embraced reinforced PE-encapsulated particles (with 0.5% by weight CNTs as a reinforcement) were then subjected to a heat treatment (up to 900° C.) that converted PE to carbon. The converted carbon was formed into a reinforced, porous 3D carbon foam structure connecting the Si particle surface with the encapsulating graphene shell. Such a strategy leads to dramatically improved battery cycle life.

In a third experiment, the Si particles were subjected to electrochemical prelithiation to prepare several samples containing from 5% to 54% Li. Prelithiation of an electrode active material means the material is intercalated or loaded with lithium before a battery cell is made. Various prelithiated Si particles were then subjected to the presently invented graphene encapsulation treatment (as in the second experiment, but the PE contains 0.2% carbon nanofibers). The resulting graphene-encapsulated CNF-reinforced carbon foam-protected prelithiated Si particles were incorporated as an anode active material in several lithium-ion cells.

Example 6: Graphene-Embraced Carbon Foam-Protected Ge Particles (Using Mesocarbon Microbeads or MCMBs as the Graphene Source)

In one example, 500 grams of B-doped Ge powder (anode active material) protected by polyurethane resin and 10 grams of MCMBs (China Steel Chemical Co., Taiwan) were placed in a ball mill (with or without milling balls), and processed for 3 hours. In separate experiments, un-processed MCMB was removed by sieving, air classification, and settling in a solvent solution. The graphene loading of the graphene-coated PU-protected Ge particles was estimated to be 1.4 weight %. These particles were then heat treated by heating the material from room temperature gradually to 900° C. at a rate of approximately 20 degrees per minutes and then stayed at 900° C. for 2 hours.

Example 7: Graphene Encapsulation Via Indirect Direct Transfer Vs. Chemical Production of Graphene Sheets A sample of graphene-embraced polymer-protected $Mn_3O_4$ particles was prepared via the presently invented indirect transfer method (using silicon carbide balls as the milling media and natural graphite as the graphene source).

In a separate experiment, 10 grams of polymer-protected $Mn_3O_4$ powder and 1 gram of reduced graphene oxide sheets (produced with the Hummer's method explained below) were placed in a freezer mill (Spex Mill, Spex Sample Prep, Metuchen N.J.) and processed for 10 minutes. In this experiment, graphite oxide as prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove the majority of the sulfate ions. The sample was then washed repeatedly with deionized water until the pH of the filtrate was neutral. The slurry was spray-dried and placed in a vacuum oven at 60° C. for 24 hours. The interlayer spacing of the resulting laminar graphite oxide was determined by the Debey-Scherrer X-ray technique to be approximately 0.73 nm (7.3 Å). A sample of this material was subsequently transferred to a furnace pre-set at 650° C. for 2 minutes for exfoliation and heated in an inert atmosphere furnace at 1200° C. for 2 hours to create a low density powder comprised of few-layer reduced graphene oxide (RGO). Surface area was measured via nitrogen adsorption BET.

As discussed in the Background section, there are several major problems associated with the chemical method of graphene production. In addition, the graphene sheets, once produced, tend to result in the formation of multiple-particle particulates that each contains a plurality of electrode active material particles embraced or encapsulated by graphene sheets. They appear to be incapable of encapsulating a single particle.

Example 8: Preparation and Electrochemical Testing of Various Battery Cells

For most of the anode and cathode active materials investigated, we prepared lithium-ion cells or lithium metal cells using the conventional slurry coating method. A typical anode composition includes 85 wt. % active material (e.g., graphene-encapsulated, carbon foam-protected Si or $Co_3O_4$ particles), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

In lithium-ion battery industry, it is a common practice to define the cycle life of a battery as the number of charge-discharge cycles that the battery suffers 20% decay in capacity based on the initial capacity measured after the required electrochemical formation.

Figure 5:
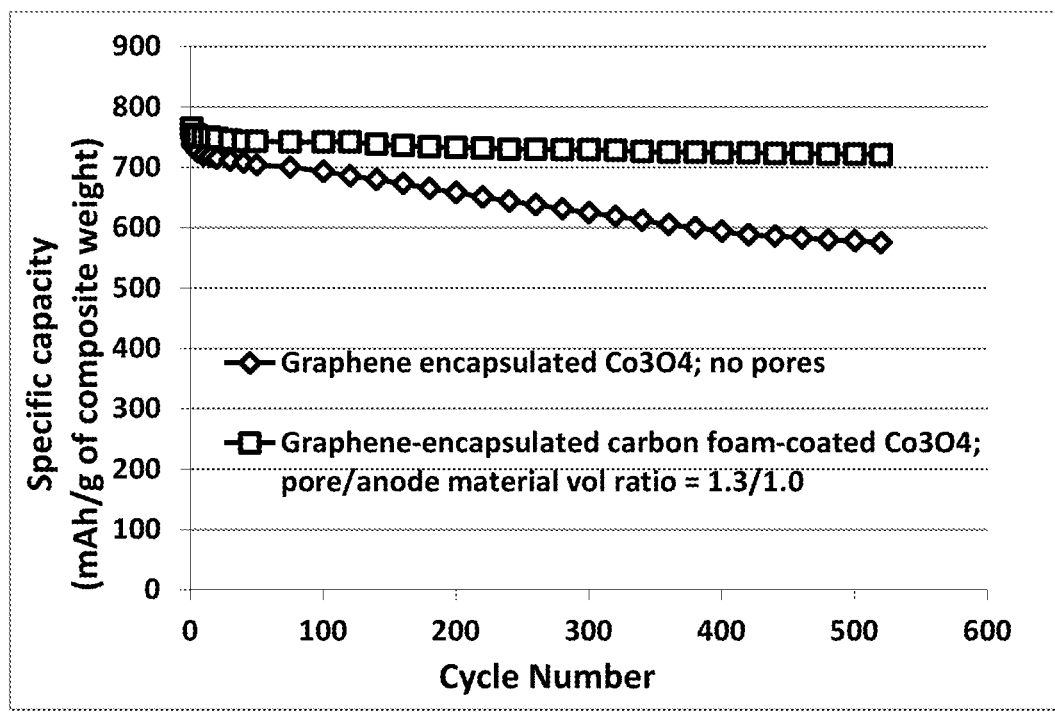
FIG. 5 The charge-discharge cycling behaviors of 2 lithium cells featuring Co$_3$O$_4$ particle-based anodes: one cell containing graphene-embraced Co$_3$O$_4$ particles (no carbon foam connecting graphene sheets and anode active particles; substantially no pores) and the other cell containing graphene-encapsulated, carbon foam-protected Co$_3$O$_4$ particles produced by the instant impact transfer method (having a pore-to-anode particle volume ratio of 1.3/1.0).

FIG. 5 shows the charge-discharge cycling behaviors of 2 lithium cells featuring $Co_3O_4$ particle-based anodes: one cell containing graphene-embraced $Co_3O_4$ particles (no carbon foam connecting graphene sheets and anode active particles; substantially no pores) and the other cell containing graphene-encapsulated, carbon foam-protected $Co_3O_4$ particles produced by the instant impact transfer method (having a pore/anode particle volume ratio of 1.3/1.0). It is clear that the presently invented chemical-free production method leads to graphene-encapsulated, carbon foam-protected $Co_3O_4$ particles that exhibit significantly more stable battery cycle behavior. The cell containing graphene-encapsulated $Co_3O_4$ particles (no carbon foam) has a cycle life of approximately 340 cycles, at which the capacity suffers a 20% decay. In contrast, the cell featuring the graphene-encapsulated, carbon foam-protected $Co_3O_4$ particles prepared according to the instant invention experiences only a 5.75% reduction in capacity after 520 cycles. Thus, the cycle life is expected to exceed 1,500 cycles. We have further observed that, in general, a higher pore-to-anode active material ratio leads to a longer cycle life until when the ratio reaches approximately 1.9/1.0 for the $Co_3O_4$ particle-based electrode.

Figure 6:
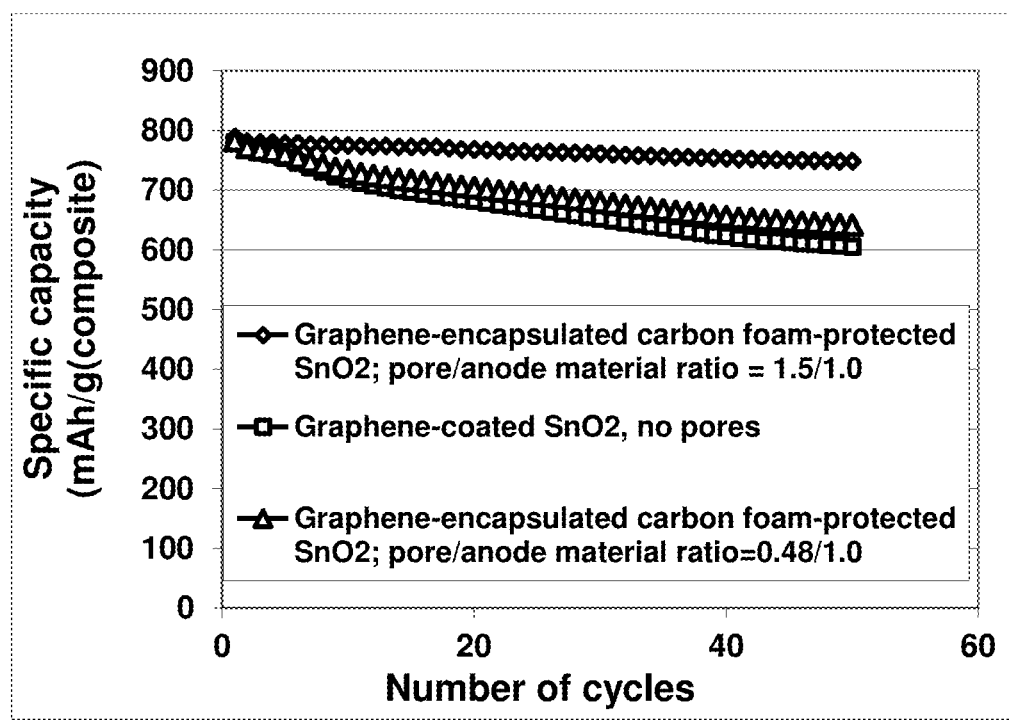
FIG. 6 The specific capacity values of 3 lithium-ion cells having SnO$_2$ particles as the an anode active material: one cell featuring graphene-encapsulated SnO$_2$ particles having no pores between encapsulating graphene sheets and SnO$_2$ particles; second cell having a carbon foam between the encapsulating graphene sheets and SnO$_2$ particles with a pore-to-SnO$_2$ volume ration of 0.48/1.0; third cell having a carbon foam between the encapsulating graphene sheets and SnO$_2$ particles with a pore-to-SnO$_2$ volume ration of 1.5/1.0.

Shown in FIG. 6 are the charge-discharge cycling behaviors (specific capacity) of 3 lithium-ion cells each having $SnO_2$ particles as the an anode active material: one cell featuring graphene-encapsulated $SnO_2$ particles having no pores between encapsulating graphene sheets and $SnO_2$ particles; second cell having a carbon foam between the encapsulating graphene sheets and $SnO_2$ particles with a pore-to-$SnO_2$ volume ration of 0.48/1.0; third cell having a carbon foam between the encapsulating graphene sheets and $SnO_2$ particles with a pore-to-$SnO_2$ volume ration of 1.5/1.0. The presently invented strategy of implementing not only embracing graphene sheets but also carbon foam connecting the graphene sheets and the anode active material particles imparts a much stable cycle life to a lithium-ion battery. Again, a higher pore-to-anode active material ratio leads to a longer cycle life until when the ratio reaches approximately 2.2/1.0 for the $SnO_2$ particle-based anode.

Figure 7:
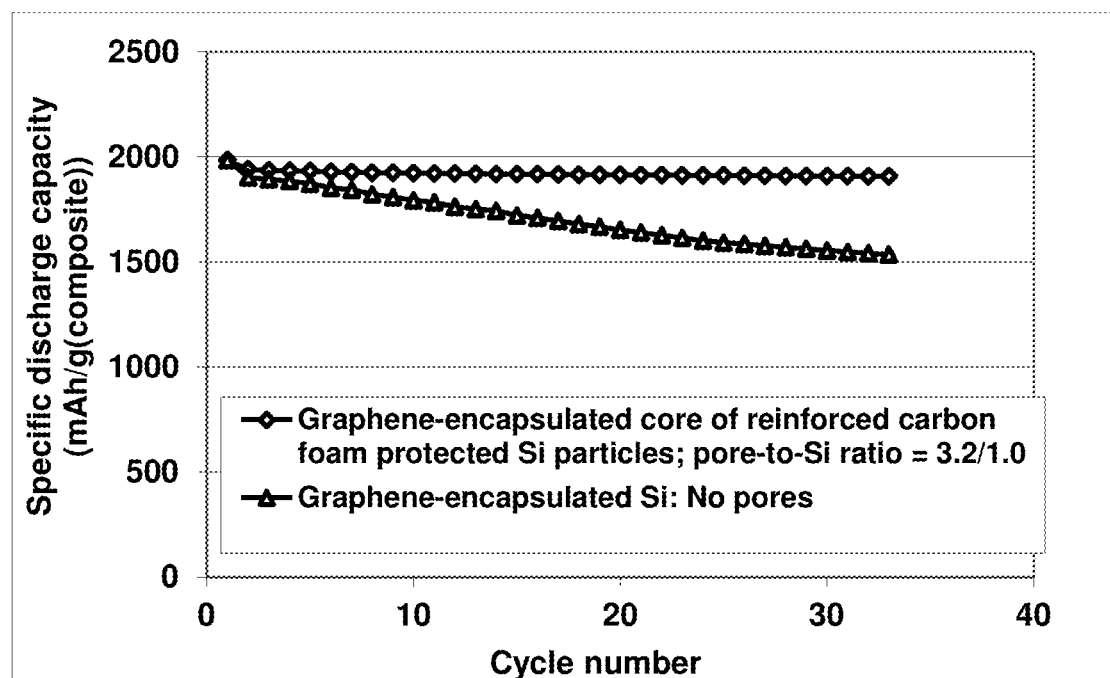
FIG. 7 The specific capacity values of 2 lithium-ion cells each featuring micron-scaled (3 μm) Si particle-based anodes: one cell containing graphene-embraced Si particles produced by the indirect transfer method (with externally added milling media, ZrO$_2$ balls) but no carbon foam, and the other cell containing graphene-encapsulated, CNT-reinforced carbon foam protected graphene-coated Si particles produced by the indirect transfer method. The pore-to-Si volume ratio is approximately 3.2/1.0.

Shown in FIG. 7 are the charge-discharge cycling behaviors of 2 lithium-ion cells featuring micron-scaled (3 μm) Si particle-based anodes: one cell containing graphene-embraced Si particles produced by the indirect transfer method (with externally added milling media, $ZrO_2$ balls) but no carbon foam, and the other cell containing graphene-encapsulated, CNT-reinforced carbon foam protected graphene-coated Si particles produced by the indirect transfer method. The pore-to-Si volume ratio is approximately 3.2/1.0. Again, the invented strategy leads to very stable cycling behavior.

Figure 8:
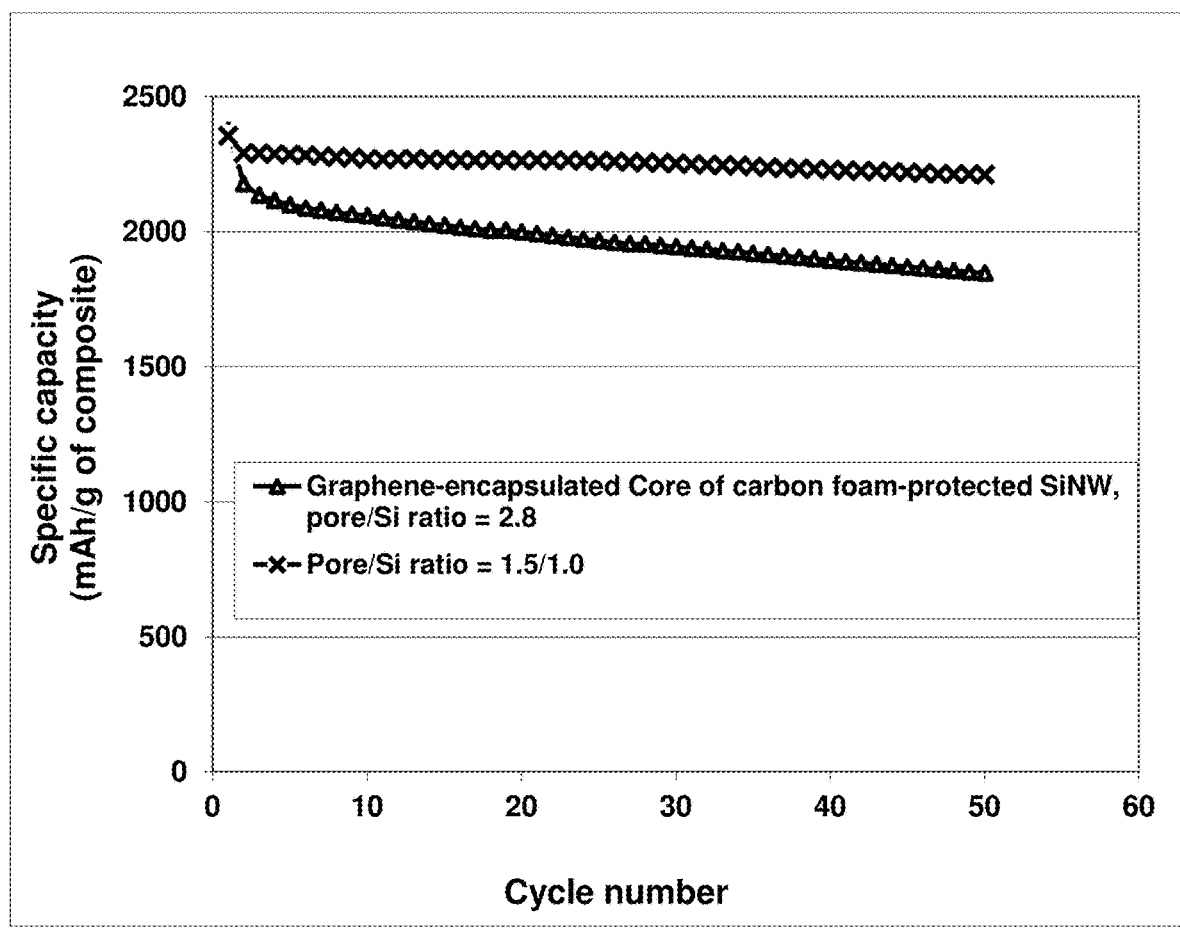
FIG. 8 Specific capacities of 2 lithium-ion cells having a core of Si nanowires (SiNW) embedded in an expanded graphite flake-reinforced carbon foam matrix having a pore-to-Si volume ratio of 2.8/1.0 and the other a pore-to-Si volume ratio of 1.5/1.0.

Summarized in FIG. 8 are the specific capacities of 2 lithium-ion cells each having a core of Si nanowires (SiNW) embedded in an expanded graphite flake-reinforced carbon foam matrix derived from a reinforced phenolic resin: one having a pore-to-Si volume ratio of 2.8/1.0 and the other a pore-to-Si volume ratio of 1.5/1.0. This result demonstrates the effectiveness of implementing an adequate amount of pores to accommodate the volume expansion of an anode active material to ensure cycling stability of a lithium-ion battery featuring a high-capacity anode active material, such as Si. We have further observed that a reinforcement material (e.g. expanded graphite flakes, graphene sheets and CNTS) in the carbon matrix also helps to maintain the structural integrity of the carbon foam matrix against the repeated volume expansion/shrinkage of the anode active material particles.

The invention claimed is:

1. An anode particulate for a lithium battery, said particulate comprising a core and a thin encapsulating layer that fully encapsulates or embraces said core, wherein said core comprises a single or a plurality of primary particles of an anode active material, having a volume Va, dispersed or embedded in a porous carbon matrix or carbon foam, wherein said porous carbon matrix or carbon foam contains pores having a pore volume Vp, and said thin encapsulating layer comprises graphene sheets and has a thickness from 1 nm to 10 μm, an electric conductivity from $10^{-6}$ S/cm to 20,000 S/cm and a lithium ion conductivity from $10^{-8}$ S/cm to $5\times10^{-2}$ S/cm and wherein the volume ratio Vp/Va is from 0.3/1.0 to 5.0/1.0 and the porous carbon matrix or carbon foam electronically and/or ionically connects the encapsulating layer to the primary particles of the anode active material.

2. The anode particulate of claim 1, wherein said graphene sheets are selected from pristine graphene, graphene fluoride, graphene chloride, graphene bromide, graphene iodide, nitrogenated graphene, hydrogenated graphene, doped graphene, chemically functionalized graphene, or a combination thereof and wherein said graphene sheets do not include CVD graphene, graphene oxide (GO), and reduced graphene oxide (RGO).

3. The anode particulate of claim 1, wherein said graphene sheets are selected from CVD graphene, graphene oxide (GO), or reduced graphene oxide (RGO).

4. The anode particulate of claim 1, wherein said graphene sheets are chemically bonded with a carbon material.

5. The anode particulate of claim 1, wherein said porous carbon matrix or carbon foam is reinforced with a high-strength material selected from carbon nanotubes, carbon nanofibers, carbon or graphite fibers, graphene sheets, expanded graphite flakes, polymer fibrils, glass fibers, ceramic fibers, metal filaments or metal nanowires, whiskers, or a combination thereof.

6. The anode particulate of claim 1, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

7. The anode particulate of claim 6, wherein said Li alloy contains from 0.1% to 10% by weight of a metal element selected from Zn, Ag, Au, Mg, Ni, Ti, Fe, Co, V, or a combination.

8. The anode particulate of claim 1, wherein said anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein x=1 to 2.

9. The anode particulate of claim 1, wherein said anode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

10. The anode particulate of claim 1, wherein at least one of said anode active material particles is coated with a layer of carbon or graphene disposed between said particle and said porous carbon foam.

11. The anode particulate of claim 1, wherein said particulate further comprises from 0.1% to 40% by weight of a lithium ion-conducting additive dispersed in said thin encapsulating layer or in ionic contact with said anode active material particles encapsulated therein.

12. The anode particulate of claim 11, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

13. The anode particulate of claim 11, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

14. A mass of anode particulates containing the anode particulate of claim 1.

15. A battery anode containing said particulate of claim 1.

16. A battery containing the battery anode of claim 15.

17. The battery of claim 16, wherein said battery is a lithium-ion battery, lithium metal secondary battery, lithium-sulfur battery, lithium-air battery, or lithium-selenium battery.

18. An impact-transfer method for producing multiple anode particulates, said method comprising:
   a) mixing multiple particles of a graphitic material, multiple polymer-coated anode active material particles, and with or without the presence of externally added milling balls or beads, to form a mixture in an impacting chamber of an energy impacting apparatus;
   b) operating said energy impacting apparatus with a frequency and an intensity for a length of time sufficient for peeling off graphene sheets from said particles of graphitic material and transferring said peeled graphene sheets to surfaces of said polymer-coated anode active material particles and embrace or encapsulate said polymer-coated particles to produce particles of graphene-embraced or graphene-encapsulated polymer-coated anode active material particles inside said impacting chamber;
   c) recovering said particles of graphene-embraced or graphene-encapsulated polymer-coated anode active material from said impacting chamber and separating said particles of ball-milling media from said particles of graphene-embraced or graphene-encapsulated polymer-coated anode active material; and
   d) thermally converting said polymer in said polymer-coated particles into a porous carbon matrix or carbon foam to obtain said multiple anode particulates, wherein said anode particulate comprises a core and a thin encapsulating layer that encapsulates or embraces said core, wherein said core comprises a single or a plurality of primary particles of an anode active material dispersed or embedded in a porous carbon matrix or carbon foam, wherein said thin encapsulating layer comprises graphene sheets.

19. The method of claim 18, wherein said polymer contains a blowing agent, a reinforcement material, or both dispersed therein.

20. The method of claim 18, where said multiple polymer-coated anode active material particles are produced by operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, extrusion and pelletizing, or a combination thereof.

21. The method of claim 18, wherein said particles of ball-milling media contain milling balls selected from ceramic particles, including $ZrO_2$ and non-$ZrO_2$ metal oxide particles, metal particles, glass particles, polymer particles, or a combination thereof.

22. The method of claim 18, wherein said polymer-coated anode active material particles comprise a polymer selected from a thermoplastic, thermoset resin, rubber or elastomer, filled or reinforced polymer, interpenetrating polymer network, biopolymer, pitch, sugar, starch, or a combination thereof.

23. The method of claim 18, further comprising a step of incorporating said particulate into a battery anode electrode.

24. The method of claim 18, wherein said particles of anode active material contain prelithiated particles having 0.1% to 54.7% by weight of lithium ions preloaded into said particles prior to step (a) of mixing.

25. The method of claim 18, wherein said particles of anode active material contain particles pre-coated with a layer of conductive material selected from a carbon, pitch, carbonized resin, conductive polymer, conductive organic material, metal coating, metal oxide shell, graphene, or a combination thereof.

26. The method of claim 18, further comprising a step of exposing said multiple particulates to a liquid or vapor of a conductive material that is conductive to electrons and/or ions of lithium.

27. The method of claim 18, wherein said particles of anode active material are selected from the group consisting of:
(A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd);
(B) lithiated and un-lithiated alloys or intermetallic compounds of Si, Ge, Sn, Pb, Sb, Bi, Zn, Al, Ti, Ni, Co, or Cd with other elements;
(C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites;
(D) lithiated and un-lithiated salts and hydroxides of Sn;
(E) lithium titanate, lithium manganate, lithium aluminate, lithium-containing titanium oxide, lithium transition metal oxide;
and combinations thereof.

28. The method of claim 18, wherein said anode active material particles include powder, flakes, beads, pellets, spheres, wires, fibers, filaments, discs, ribbons, or rods, having a diameter or thickness from 2 nm to 20 μm.

29. The method of claim 18, wherein said graphitic material is selected from natural graphite, synthetic graphite, highly oriented pyrolytic graphite, graphite fiber, graphitic nanofiber, graphite fluoride, chemically modified graphite, mesocarbon microbead, partially crystalline graphite, or a combination thereof.

30. The method of claim 18, wherein the energy impacting apparatus is a vibratory ball mill, planetary ball mill, high energy mill, basket mill, agitator ball mill, cryogenic ball mill, microball mill, tumbler ball mill, continuous ball mill, stirred ball mill, pressurized ball mill, attritor, plasma-assisted ball mill, freezer mill, vibratory sieve, bead mill, nanobead mill, ultrasonic homogenizer mill, centrifugal planetary mixer, vacuum ball mill, or resonant acoustic mixer.

31. The method of claim 18, wherein said procedure of operating said energy impacting apparatus is conducted in a continuous manner using a continuous energy impacting device.

* * * * *